No. 806,547. PATENTED DEC. 5, 1905.
T. LEES.
CAMP STOOL AND LIKE SEAT.
APPLICATION FILED JAN. 11, 1905.
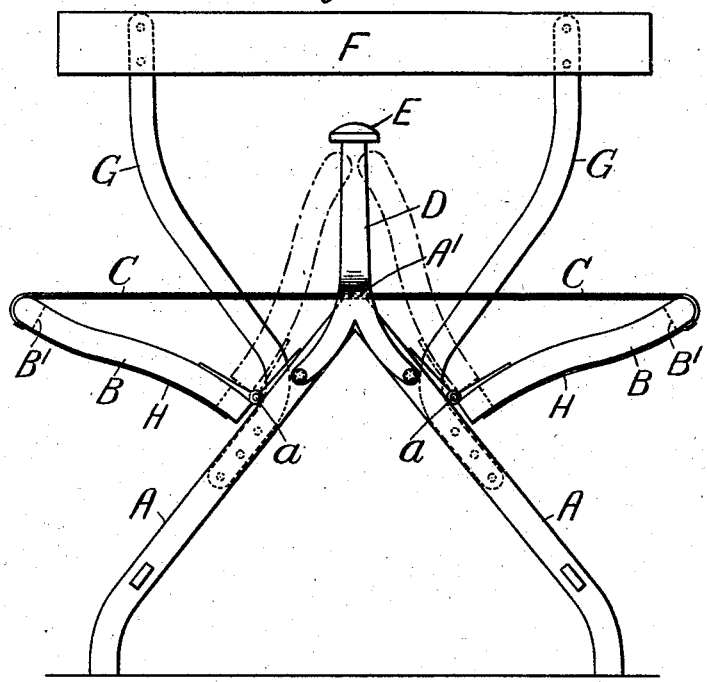
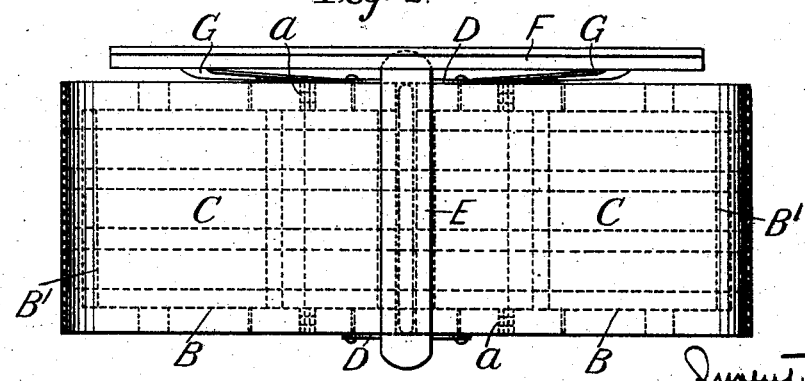

UNITED STATES PATENT OFFICE.

THOMAS LEES, OF GIRVAN, SCOTLAND.

CAMP-STOOL AND LIKE SEAT.

No. 806,547.  Specification of Letters Patent.  Patented Dec. 5, 1905.

Application filed January 11, 1905. Serial No. 240,545.

*To all whom it may concern:*

Be it known that I, THOMAS LEES, a subject of the King of the United Kingdom of Great Britain and Ireland, residing at Girvan, Scotland, have invented certain new and useful Improvements in Camp-Stools and Like Seats, of which the following is a specification.

This invention has for its object to provide seats of the camp-stool type principally for outdoor use, as on char-à-bancs, tram-cars, railway-carriages, motor-cars, and on board steamers, but also applicable for indoor purposes, and which may be conveniently folded up to keep the seat dry when not in use.

The improved seat, which, as illustrated in the accompanying drawings in front elevation at Figure 1 and in plan at Fig. 2, is preferably made for seating two persons, one alongside the other, comprises a framing A of triangular form, as seen in front elevation, and having hinged on each of its inclined sides at front and back, as at *a a*, a pair of brackets B B, whose outer ends are braced by a connecting-bar B', which when the seat is in use is about level with the apex A' of the triangular frame A. A length of carpeting C or other fabric or flexible material is stretched to extend across the brackets B B on each side of the triangular frame, being secured at each end to the cross-bar B' of each pair of brackets, so as to form a soft and flexible seat on each side of the triangular frame A, above the apex of which latter uprights D D extend, carrying a divisional rail E, which serves the twofold purpose of an arm-support and as means for keeping dry the seats when the hinged brackets B B are folded up, so that their cross-bar ends B' meet under it, as indicated by dotted lines at Fig. 1.

A back-support F is carried upon arms G, and these may be fixed or arranged to swing so as to permit of the support F being brought to front or rear of the seats, as in ordinary tram-car seats.

To insure that the seats may be kept dry in wet weather or in cleaning the vehicle on which they are fitted, they may be made to fold up, and on the under sides of the brackets B B, which are exposed when the brackets are folded up, sheets H of waterproof or like material may be attached.

Having now described my invention, what I claim, and desire to secure by Letters Patent of the United States, is—

1. A folding seat comprising in combination a framing A having hinged at each side, brackets B braced by a connecting-bar B', and having a length of flexible material attached to said bars and stretched across the brackets to form a soft seat on each side of the frame as described.

2. A folding seat comprising in combination a triangular framing having uprights carrying a divisional rail, brackets braced by connecting-bars and hinged to each side of the frame, a length of flexible material attached to said bars and stretched across the brackets to form a folding seat on each side of the frame as described.

In testimony whereof I have signed my name to this specification in the presence of two subscribing witnesses.

THOMAS LEES.

Witnesses:
 WALLACE FAIRWEATHER,
 JNO. ARMSTRONG, Junr.